United States Patent
Einoegg et al.

(10) Patent No.: US 11,183,718 B2
(45) Date of Patent: Nov. 23, 2021

(54) BATTERY MODULE FOR A HIGH-VOLTAGE BATTERY OF A MOTOR VEHICLE, HIGH-VOLTAGE BATTERY AND MOTOR VEHICLE

(71) Applicant: Bayerische Motoren Werke Aktiengesellschaft, Munich (DE)

(72) Inventors: Florian Einoegg, Biessenhofen (DE); Philipp Schlag, Munich (DE); Martin Spaeth, Munich (DE); Markus Stoll, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/967,631

(22) PCT Filed: Jun. 4, 2019

(86) PCT No.: PCT/EP2019/064420
§ 371 (c)(1),
(2) Date: Aug. 5, 2020

(87) PCT Pub. No.: WO2020/001927
PCT Pub. Date: Jan. 2, 2020

(65) Prior Publication Data
US 2021/0257691 A1    Aug. 19, 2021

(30) Foreign Application Priority Data
Jun. 27, 2018 (DE) .................... 10 2018 210 444.1

(51) Int. Cl.
*H01M 10/6554* (2014.01)
*H01M 10/625* (2014.01)
*H01M 10/6556* (2014.01)
*H01M 10/613* (2014.01)
*H01M 50/249* (2021.01)
*H01M 50/209* (2021.01)

(52) U.S. Cl.
CPC ..... *H01M 10/6554* (2015.04); *H01M 10/613* (2015.04); *H01M 10/625* (2015.04);
(Continued)

(58) Field of Classification Search
CPC ........... H01M 10/6554; H01M 10/613; H01M 10/625; H01M 10/6556
See application file for complete search history.

(56) References Cited

U.S. PATENT DOCUMENTS

2011/0189527 A1* 8/2011 Michelitsch ...... H01M 10/6568
429/120
2014/0193686 A1 7/2014 Siering et al.
2017/0346142 A1 11/2017 Landerer et al.

FOREIGN PATENT DOCUMENTS

CN         206619669 U  * 11/2017
DE    10 2011 084 660 A1    4/2013
(Continued)

OTHER PUBLICATIONS

International Search Report (PCT/ISA/210) issued in PCT Application No. PCT/EP2019/064420 dated Aug. 23, 2019 with English translation (four (4) pages).
(Continued)

*Primary Examiner* — Jonathan G Jelsma
(74) *Attorney, Agent, or Firm* — Crowell & Moring LLP

(57) ABSTRACT

A battery module for a high-voltage battery of a motor vehicle includes a cell stack with a plurality of prismatic battery cells stacked along a stacking direction, two end pressure plates, which are arranged on ends of the cell stack that are opposite one another in the stacking direction, and a cooling plate with a coolant connection for feeding and/or discharging a coolant. The coolant connection is formed so as to project in a vertical direction oriented perpendicularly to the stacking direction. At least one intermediate pressure plate, which is arranged between two battery cells within the
(Continued)

cell stack and which has at least one passage opening along the vertical direction, in which passage opening the coolant connection is arranged and is led in the direction of a top side of the cell stack fluidically couples with at least one coolant line of the high-voltage battery.

13 Claims, 2 Drawing Sheets

(52) U.S. Cl.
CPC ..... *H01M 10/6556* (2015.04); *H01M 50/209* (2021.01); *H01M 50/249* (2021.01); *H01M 2220/20* (2013.01)

(56) References Cited

FOREIGN PATENT DOCUMENTS

| | | |
|---|---|---|
| DE | 10 2012 219 301 A1 | 2/2014 |
| DE | 10 2015 207 666 A1 | 10/2016 |
| DE | 10 2015 216 218 A1 | 3/2017 |

OTHER PUBLICATIONS

German-language Written Opinion (PCT/ISA/237) issued in PCT Application No. PCT/EP2019/064420 dated Aug. 23, 2019 (five (5) pages).

German-language Office Action issued in German Application No. 10 2018 210 444.1 dated Feb. 27, 2019 with English translation (nine (9) pages).

German-language Decision to Grant issued in German Application No. 10 2018 210 444.1 dated Mar. 29, 2019 with partial English translation (16 pages).

English Translation of German-language Office Action issued in German Application No. 10 2018 210 444.1 dated Feb. 27, 2019 (11 pages).

English Translation of German-language Decision to Grant issued in German Application No. 10 2018 210 444.1 dated Mar. 29, 2019 (16 pages).

\* cited by examiner

BATTERY MODULE FOR A HIGH-VOLTAGE BATTERY OF A MOTOR VEHICLE, HIGH-VOLTAGE BATTERY AND MOTOR VEHICLE

BACKGROUND AND SUMMARY OF THE INVENTION

The invention relates to a battery module for a high-voltage battery of a motor vehicle, having a cell stack with a large number of prismatic battery cells which are stacked along a stacking direction, two end pressure plates which are arranged at ends of the cell stack which are situated opposite one another in the stacking direction, and a cooling plate which is arranged on a bottom side of the cell stack and has a coolant connection for feeding and/or discharging a coolant which is conducted in the cooling plate. The invention also relates to a high-voltage battery and to a motor vehicle.

At present, interest is directed, in particular, at high-voltage batteries or rechargeable high-voltage batteries for electrically driveable motor vehicles, for example electric or hybrid vehicles. High-voltage batteries of this kind usually have a large number of battery modules, wherein each battery module can have prismatic battery cells which are stacked and interconnected to form a cell stack. Each cell stack is usually arranged in a cell module frame for bracing the battery cells. A cell module frame of this kind usually has two end pressure plates, between which the cell stack is arranged, and two clamps, for example tie rods, which compress the end pressure plates and therefore the battery cells. Excessive deformation of the battery cells during operation of the high-voltage battery can be prevented in this way.

In order to avoid overheating of the battery cells during operation, the battery cells are usually cooled. To this end, a cooling plate can be arranged on a bottom side of the cell stack, in which cooling plate a coolant is guided along the bottom side. The cooling plate usually has a coolant connection for conducting coolant into the cooling plate and for removing coolant from the cooling plate. The coolant connection can be coupled, for example, to coolant lines. If the coolant connection is designed to protrude laterally from the cooling plate, the cooling lines have to be guided next to the battery modules and the battery modules have to be positioned at a certain distance from one another. This increases an installation space of the high-voltage battery and, respectively, reduces a range of the motor vehicle which can be achieved by the high-voltage battery.

The object of the present invention is to provide a particularly compact, installation space-saving high-voltage battery for an electrically driveable motor vehicle, which battery can be cooled in an efficient manner.

According to the invention, this object is achieved by a battery module, a high-voltage battery and a motor vehicle having the features according to the respective independent patent claims. Advantageous embodiments of the invention are the subject matter of the dependent patent claims, the description and the figures.

A battery module according to the invention for a high-voltage battery of a motor vehicle has a cell stack with a large number of prismatic battery cells which are stacked along a stacking direction and two end pressure plates which are arranged at ends of the cell stack, which are situated opposite one another in the stacking direction, and are designed for exerting a contact pressure onto the battery cells. The battery module further has a cooling plate which is arranged on a bottom side of the cell stack and has a coolant connection for feeding and/or discharging a coolant which is conducted in the cooling plate, wherein the coolant connection is designed so as to protrude from a top side of the cooling plate, which top side faces the bottom side of the cell stack, in a vertical direction which is oriented perpendicularly to the stacking direction. Furthermore, the battery module has at least one intermediate pressure plate which is arranged between two battery cells within the cell stack and has at least one passage opening along the vertical direction, in which passage opening the coolant connection is arranged and is guided in the direction of a top side of the cell stack for fluidic coupling to at least one coolant line of the high-voltage battery.

In order to form the cell stack or cell block, the prismatic battery cells are stacked one on the other along the stacking direction. The prismatic battery cells or secondary cells have a cell housing in the shape of a flat cuboid. In order to stack the battery cells, a front side of one battery cell is arranged on a rear side of another battery cell, and so on. The stacked battery cells are arranged in a cell module frame which comprises the two end plates. In this case, the cell stack is arranged between the end plates, so that a first, front end plate bears against the front side of a first battery cell in the cell stack, and a second, rear end plate bears against the rear side of a last battery cell in the cell stack. The cell module frame also has clamps, for example tie rods, which are guided on sides of the cell stack which are situated opposite one another in the width direction of the battery cells. The width direction is oriented perpendicularly to the stacking direction and perpendicularly to the vertical direction. The clamps serve to compress the end pressure plates for bracing the battery cells along the stacking direction. Therefore, age- and operation-related deformation of the battery cells, for example expansion of the battery cells along the stacking direction, can be reduced.

The battery module also has the cooling plate which can be arranged so as to bear against the bottom side of the cell stack. The cell stack is therefore arranged on the cooling plate in the vertical direction. The cooling plate can have at least one cooling duct in which the coolant is guided along the bottom side of the cell stack in order to cool the battery cells. The cooling plate has the coolant connection via which the coolant can be supplied to and/or removed from the cooling plate. The coolant connection is designed so as to protrude from the top side of the cooling plate in the upward direction and is guided, in particular, through the cell stack, so that it is accessible from the top side of the cell stack.

To this end, the battery module has the at least one intermediate pressure plate which is arranged within the cell stack. For example, the battery module can have precisely one intermediate pressure plate which is arranged centrally and subdivides the cell stack into two partial cell stacks of the same size. A plurality of intermediate pressure plates which subdivide the cell stack into a plurality of partial cell stacks, in particular of the same size, can also be provided. The intermediate pressure plate can have similar geometric dimensions to the battery cells. In particular, the intermediate pressure plate has the same width as the battery cells. A height of the intermediate pressure plate corresponds at most to a height of the battery cells.

The intermediate pressure plate also has the at least one passage opening which extends from a bottom side of the intermediate pressure plate, which bottom side faces the cooling plate, to a top side of the intermediate pressure plate in the vertical direction. The intermediate pressure plate with the at least one passage opening can be manufactured, for example, by extrusion. However, provision can also be made for the intermediate pressure plate to be formed from a solid material into which the passage opening is drilled. In this case, the passage opening forms a duct which is oriented along the vertical direction and through the intermediate pressure plate which accommodates the coolant connection or into which the coolant connection is inserted. In addition, the passage opening has a size which corresponds to a size of the coolant connection.

Owing to the coolant connection extending into the passage opening, the coolant connection is accessible from the top side of the cell stack and can be fluidically coupled there, for example, to the at least one coolant line of the high-voltage battery. This coolant line can then be guided along the top side of the battery module and no longer has to be guided on sides of the battery module. As a result, a plurality of battery modules can be lined up particularly close to one another in order to form the high-voltage battery. The battery modules can also be supported at the positions of the intermediate pressure plate in the motor vehicle and as a result the battery modules are stabilized. As a result, the battery modules can have an increased number of battery cells. Owing to providing the intermediate pressure plate with the passage opening, a particularly compact high-voltage battery, which provides a high range for the motor vehicle on account of the high packing density, can be realized.

In a development of the invention, the battery module has two clamps which are guided along the stacking direction on opposite sides of the cell stack and are mechanically connected to the end pressure plates for compressing the battery cells and to the at least one intermediate pressure plate. In particular, the at least one intermediate pressure plate is positively connected, preferably welded, to the clamps. The clamps or tie rods, which form the cell module frame, which surrounds the cell stack, together with the end pressure plates, are also mechanically connected to the at least one intermediate pressure plate which is arranged in the cell stack. As a result, a particularly stable battery module can be formed.

In a further embodiment of the invention, the battery module has a cell-contacting system which is arranged on the top side of the cell stack and has at least one opening for the coolant connection, wherein the at least one coolant line, which can be fluidically coupled to the coolant connection, can be arranged on a top side of the cell-contacting system. The cell-contacting system can have, for example, a frame in which contact elements are held. The frame can be arranged on the top side of the cell stack, on which cell poles or cell terminals of the battery cells are located, in such a way that the contact elements are arranged on the cell terminals and electrically connect the battery cells to one another in accordance with a prespecified interconnection plan. In a region which overlaps with the top side of the intermediate pressure plate, the frame likewise has an opening which is arranged in alignment with the passage opening in the intermediate pressure plate. The coolant connection of the cooling plate, which coolant connection is arranged in the passage opening, can be guided through the opening in the cell-contacting system to the top side of the cell-contacting system. The coolant lines can be arranged there.

In an embodiment of the invention, the coolant connection has two stubs in the form of an inlet stub and an outlet stub and the at least one intermediate pressure plate has a first passage opening for the inlet stub and a second passage opening for the outlet stub. In particular, the two stubs are arranged next to one another in a width direction, which is oriented perpendicularly to the vertical direction and to the stacking direction, on the cooling plate. Provision can be made for the two stubs to extend at least over an entire length of the passage openings in the intermediate pressure plate in the vertical direction. The stubs can be designed, for example, in a hollow-cylindrical manner, so that the passage openings are designed as circular holes in the intermediate pressure plate. Since the intermediate pressure plate has approximately the same width and height as the battery cells, and therefore does not increase either a width or a height of the cell stack, the objective is to keep the depth of the battery module in the stacking direction, which depth is increased by the intermediate pressure plate, particularly low. This is achieved by arranging the passage openings next to one another in the width direction of the intermediate pressure plate.

It has proven advantageous when the battery module has a monolithic connecting piece for connecting the two stubs on the top side of the cell stack to two coolant lines which are guided along the top side of the cell stack. The inlet stub which is accessible from the top side of the cell stack can be connected to a first coolant line, and the outlet nozzle which is accessible from the top side of the cell stack can be connected to a second coolant line. The battery module has the monolithic connecting piece for this purpose. As a result, it is not necessary for an individual connecting piece, which also has a low level of stability, to be fitted in a complicated manner at high fitting cost for each stub. A robust battery module which can be produced at reduced fitting cost is provided owing to the monolithic or integral connecting piece for connecting the two stubs to the two cooling lines.

The connecting piece preferably has two T-piece-shaped elements, wherein a first T-piece-shaped element is connected to the inlet stub and can be connected to the first coolant line, and a second T-piece-shaped element is connected to the outlet stub and can be connected to a second coolant line. The T-piece-shaped elements can also have a thread by means of which the connecting piece can be screwed to the stubs and to the coolant lines. Therefore, a particularly tight connection between the stubs and the coolant lines can be provided. The coolant lines can also be guided parallel to the top side of the cell stack owing to the T-piece-shaped elements.

In this case, provision can be made for respective sections of the T-piece-shaped elements, which sections can be connected to the coolant lines, to be oriented parallel to the top side of the cell stack along the width direction. The coolant lines can therefore be guided along the width direction and in a manner overlapping with the top side of the intermediate pressure plate over the cell stack. Therefore, the coolant lines can also be supported on the intermediate pressure plate. In particular, respective sections of the T-piece-shaped elements, which sections can be connected to the coolant lines, are arranged one behind the other in the stacking direction and respective sections of the T-piece-shaped elements, which sections are connected to the stubs, are arranged next to one another in the width direction. In this case, the sections which can be connected to the coolant lines are arranged, in particular, at the same level and one behind the other in the stacking direction. Respective sections which are connected to the stub are arranged next to one another in the width direction. Therefore, the connecting piece is of particularly compact configuration.

The invention also relates to a high-voltage battery for a motor vehicle, having at least two battery modules according to the invention or advantageous embodiments thereof and at least one coolant line which is guided along the top sides of the cell stacks and is fluidically coupled to the coolant connections of the battery modules, which coolant connections are guided through the intermediate pressure plate on the top side of the cell stack. The battery modules are preferably arranged next to one another along a width direction which is oriented perpendicularly to the vertical direction and to the stacking direction, and the at least one coolant line is guided along the top sides of the cell stacks in the width direction. Therefore, the battery modules are lined up with one another in the width direction in such a way that the coolant connections of all of the battery cells are arranged in a row. The coolant lines are also guided and supported against the intermediate pressure plates of the battery modules along this row.

A motor vehicle according to the invention comprises a high-voltage battery according to the invention. The motor vehicle is designed, in particular, as an electric or hybrid vehicle.

The embodiments presented with reference to the battery module according to the invention and the advantages of said embodiments also apply in a corresponding manner to the high-voltage battery according to the invention and to the method according to the invention.

Further features of the invention can be found in the claims, the figures and the description of the figures. The features and combinations of features mentioned above in the description and also the features and combinations of features mentioned below in the description of the figures and/or shown in the figures alone can be used not only in the respectively indicated combinations but also in other combinations or on their own.

The invention will now be explained in more detail using a preferred exemplary embodiment and with reference to the drawings.

BRIEF DESCRIPTION OF THE DRAWINGS

Identical and functionally identical elements are provided with the same reference signs in the figures.

DETAILED DESCRIPTION OF THE DRAWINGS

Figure 1:
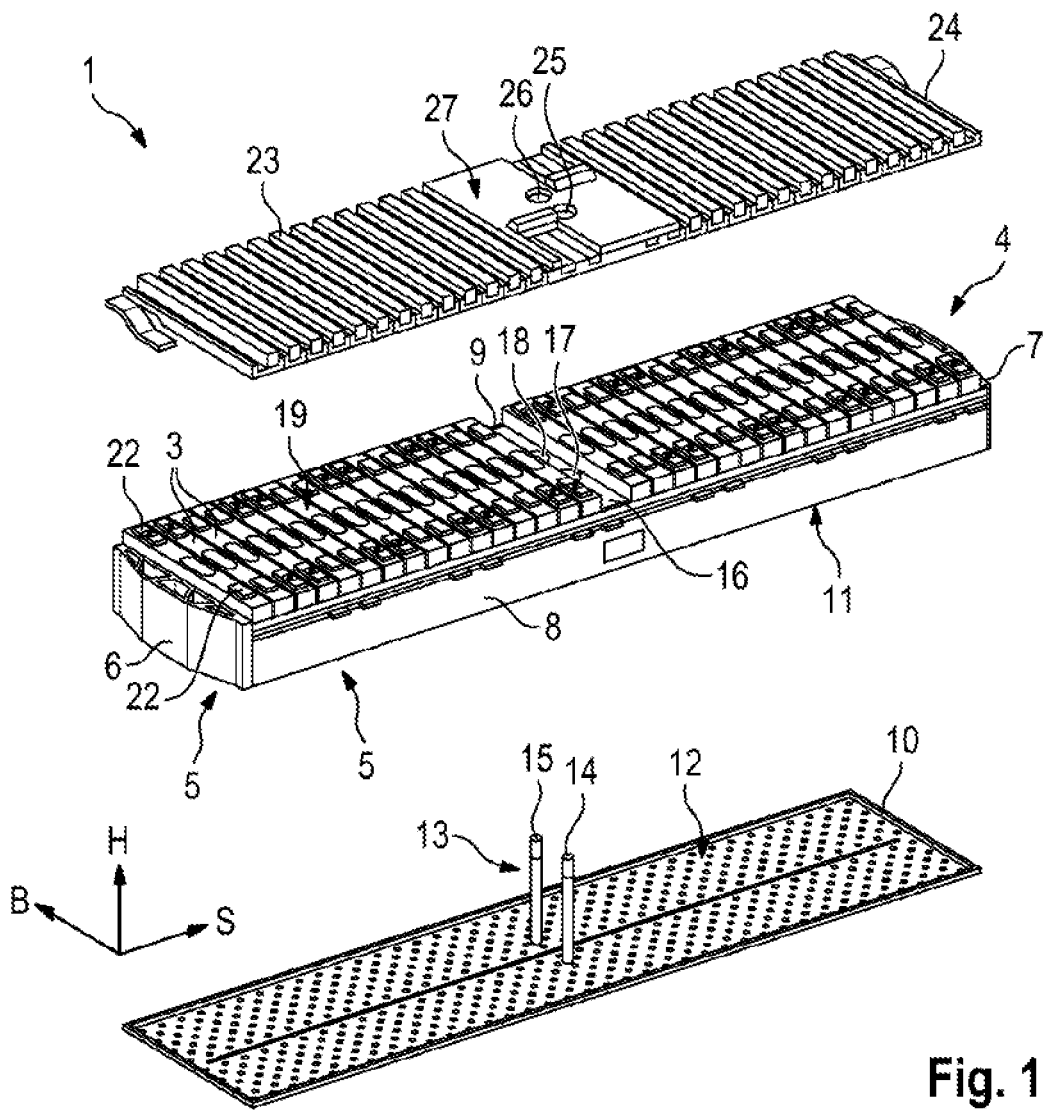
FIG. 1 shows a schematic exploded illustration of an embodiment of a battery module according to the invention.
Figure 2:
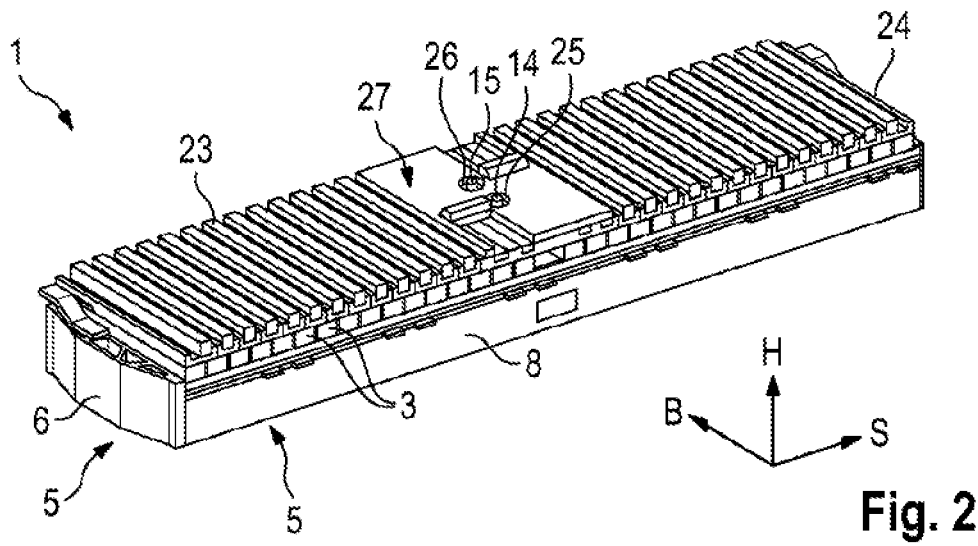
FIG. 2 shows a schematic illustration of the battery module according to FIG. 1.
Figure 3:
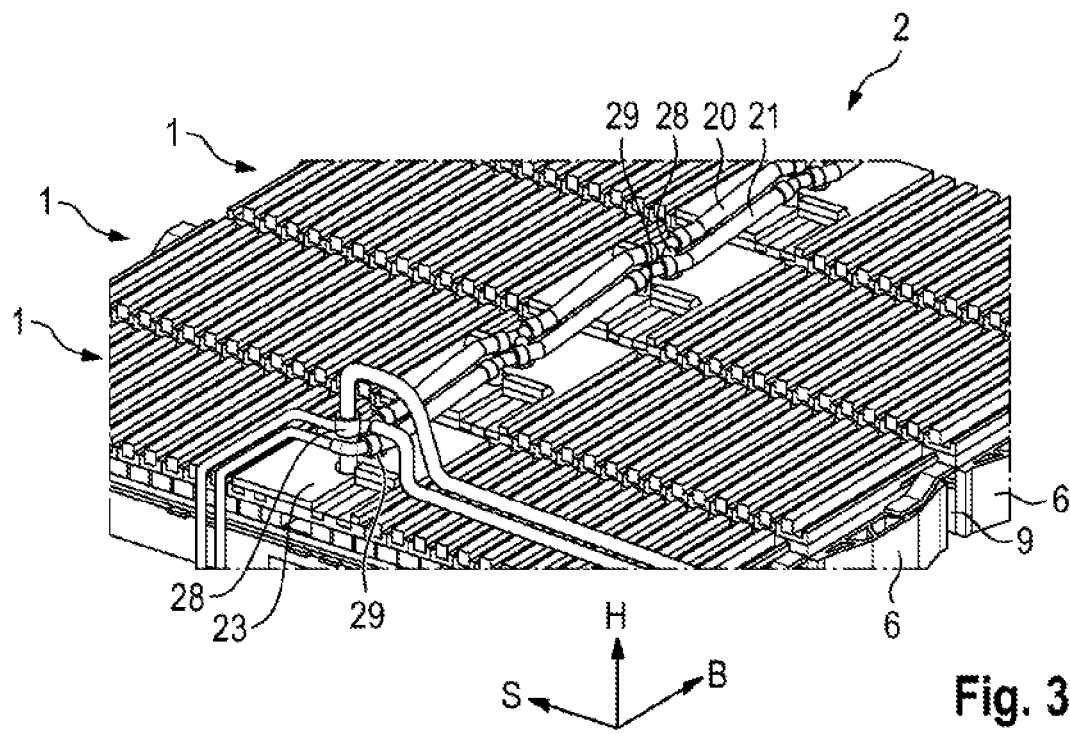
FIG. 3 shows a schematic illustration of an embodiment of a high-voltage battery according to the invention.

FIG. 1 shows an exploded illustration of a battery module 1 according to an embodiment of the present invention. FIG. 2 shows the battery module 1 in the assembled state. FIG. 3 shows a detail of a high-voltage battery 2 which has an interconnection of a plurality of battery modules 1. The battery module 1 has a large number of battery cells 3 which are stacked one on the other along a stacking direction S. The stacked battery cells 3 form a cell stack 4. The cell stack 4 is surrounded by a cell module frame 5 which has two end pressure plates 6, 7 and two clamps 8, 9. The end pressure plates 6, 7 are arranged at ends of the cell stack 4, which ends are situated opposite one another in the stacking direction S, and are connected to the clamps 8, 9. The clamps 8, 9 are arranged on sides of the cell stack 4, which sides are situated opposite one another in the width direction B, and extend along the stacking direction S. The clamps 8, 9, which are designed as tie rods, pull the end pressure plates 6, 7 together, so that they exert a contact pressure onto the battery cells 3 of the cell stack 4. Therefore, it is possible to prevent the battery cells 3 from expanding to an excessive extent during operation.

The battery module 1 also has a cooling plate 10 which is arranged on a bottom side 11 of the cell stack 4. The cooling plate 10 serves to cool the battery cells 3 by way of conducting a coolant along the bottom side 11 of the cell stack 4. The cooling plate 10 has a coolant connection 13 on its top side 12 which faces the bottom side 11 of the cell stack 4, which coolant connection in this case has two stubs 14, 15 which are arranged next to one another in the width direction B. The coolant can be conducted into the cooling plate 10 via the stub which is designed as the inlet stub 14. The coolant can be removed from the cooling plate 10 again via the stub which is designed as the outlet stub 15. The stubs 14, 15 protrude from the top side 12 of the cooling plate 10 in the vertical direction H and can be guided through the cell stack 4. To this end, the battery module 1 has an intermediate pressure plate 16 which in this case is arranged centrally within the cell stack 4 between two battery cells 3. The intermediate pressure plate 16 can also be connected, for example welded, to the clamps 8, 9, so that the battery module 1 is of particularly stable design.

In this case, the intermediate pressure plate 16 has two passage openings 17, 18 which are arranged next to one another in the width direction B. The intermediate pressure plate 16 can be formed, for example, as an extruded profile with the passage openings 17, 18. However, the passage openings 17, 18 can also be designed as passage bores. The inlet stub 14 is arranged in a first passage opening 17 and the outlet stub 15 is arranged in a second passage opening 18. The stubs 14, 15, the length of which is greater than a length of the passage openings 17, 18 in the vertical direction H in this case, are therefore accessible from a top side 19 of the cell stack 4 and can be connected to coolant lines 20, 21 (see FIG. 3) there.

Cell terminals 22 of the battery cells 3 are located on the top side 19 of the cell stack 4. The cell terminals can be electrically connected to one another by means of a cell-contacting system 23 in order to interconnect the battery cells 3. In this case, the cell-contacting system 23 has a frame 24 for holding contact elements, not shown here. The cell terminals 22 are connected to the contact elements and in this way the battery cells 3 are interconnected to one another in parallel and/or in series by placing the frame 24 onto the top side 19 of the cell stack 4. In this case, the frame 24 has openings 25, 26, wherein a first opening 25 is formed in alignment with the first passage opening 17 of the intermediate pressure plate 16 and a second opening 26 is formed in alignment with the second passage opening 18. As a result, the inlet stub 14 of the coolant connection 13 can be guided through the first opening 25, and the outlet stub 15 of the coolant connection 13 can be guided through the second opening. Therefore, the stubs 14, 15 are accessible from a top side 27 of the cell-contacting system 13.

FIG. 3 shows a plurality of battery modules 1 arranged next to one another in the width direction B. In this case, the stubs 14, 15 of the cooling plate 10, which stubs are guided out from the top side 27 of the cell-contacting system 23, are arranged in a row in the width direction B and are connected to one another via coolant lines 20, 21. The coolant lines 20, 21 and the cooling plate 10 are part of a coolant circuit. In this case, a first coolant line 20 is connected to the inlet stubs 14 of the battery modules 1, and a second coolant line 21 is connected to the outlet stubs 15 of the battery modules 1.

The coolant lines 20, 21 are guided over the battery modules 1 on the top side 27 of the cell-contacting system 23, and therefore along the top side 19 of the cell stack 4, in the width direction B. There, the coolant lines 20, 21 can be supported on the intermediate pressure plates 16 of the battery modules 1.

According to FIG. 3, each inlet stub 14 is connected to the first coolant line 20 via a respective connecting element 28, and each outlet stub 15 is connected to the second coolant line 21 via a connecting element 29. Therefore, there are separate connecting elements 28, 29, which have to be individually fitted at high fitting cost, for the inlet stubs 14 and for the outlet stubs 15. Said connecting elements also have a low level of stability, high manufacturing tolerances and a high installation space requirement.

Figure 4:
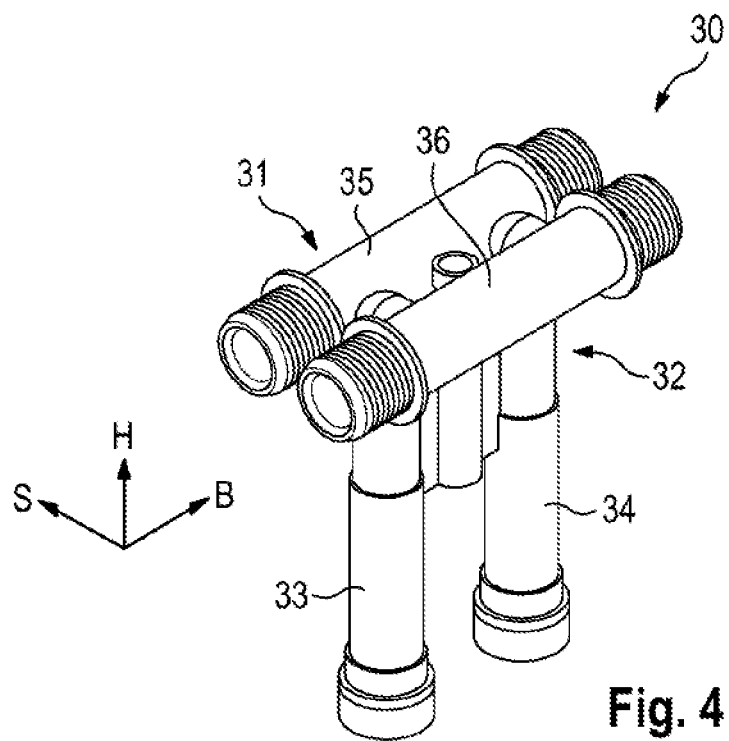
FIG. 4 shows a schematic illustration of a connecting piece in line with an embodiment of the battery module according to the invention.

FIG. 4 shows a monolithic, integral connecting piece 30 for connecting an inlet stub 14 to the first coolant line 20 and an outlet stub 15 to the second coolant line 21. The monolithic connecting piece 30 has two T-piece-shaped elements 31, 32. A first T-piece-shaped element 31 can be connected, for example screwed, to the inlet stub 14 and to the first coolant line 20. A second T-piece-shaped element 32 can be connected, for example screwed, to the outlet stub 15 and to the second coolant line 21. In this case, a tubular section 33 of the first T-piece-shaped element 31, which section is oriented in the vertical direction H, is connected to the inlet stub 14. A tubular section 34 of the second T-piece-shaped element 32, which section is oriented in the vertical direction H, is connected to the outlet stub 15. In this case, the sections 33, 34 are arranged next to one another in the width direction B. A tubular section 35 of the first T-piece-shaped element 31, which tubular section is oriented in the width direction B, is connected to the first coolant line 20. A tubular section 36 of the second T-piece-shaped element 32, which tubular section is oriented in the width direction B, is connected to the second coolant line 21. In this case, the sections 35, 36 are arranged one behind the other in the stacking direction S. Therefore, the coolant lines 20, 21 can be guided past one another in the stacking direction S and parallel to one another along the top side 19 of the cell stack 4. In this case, the sections 33, 34 which can be connected to the stubs 14, 15 are guided between the sections 35, 36, which can be connected to the coolant lines 20, 21, and are laterally connected to the sections 35, 36. The fluidic connection between the cooling plate 10 and the coolant lines 20, 21 can be established at low fitting cost by the monolithic connecting piece 30.

LIST OF REFERENCE SIGNS

1 Battery module
2 High-voltage battery
3 Battery cells
4 Cell stack
5 Cell module frame
6, 7 End pressure plate
8, 9 Clamps
10 Cooling plate
11 Bottom side of the cell stack
12 Top side of the cooling plate
13 Coolant connection
14 Inlet stub
15 Outlet stub
16 Intermediate pressure plate
17, 18 Passage openings
19 Top side of the cell stack
20, 21 Coolant lines
22 Cell terminals
23 Cell-contacting system
24 Frame
25, 26 Openings
27 Top side of the cell-contacting system
28, 29 Connecting elements
30 Monolithic connecting piece
31, 32 T-piece-shaped elements
33, 34, 35, 36 Sections
S Stacking direction
B Width direction
H Vertical direction

What is claimed is:

1. A high-voltage battery for a motor vehicle, comprising:
   at least two battery modules, each battery module comprising:
      a cell stack with a plurality of battery cells which are stacked along a stacking direction;
      two end pressure plates which are arranged at ends of the cell stack which are situated opposite one another in the stacking direction;
      a cooling plate which is arranged on a bottom side of the cell stack and has a coolant connection for feeding and/or discharging a coolant which is conducted in the cooling plate, wherein the coolant connection protrudes from a top side of the cooling plate, which top side faces the bottom side of the cell stack, in a vertical direction which is oriented perpendicularly to the stacking direction; and
      at least one intermediate pressure plate which is arranged between two battery cells within the cell stack and which has at least one passage opening along the vertical direction, in which passage opening the coolant connection is arranged and is guided in the direction of a top side of the cell stack for fluidic coupling to at least one coolant line of the high-voltage battery, wherein
   the high-voltage battery has at least one coolant line which is guided along the top sides of the cell stacks and is fluidically coupled to the coolant connections of the battery modules, which coolant connections are guided through the intermediate pressure plate on the top side of the cell stack.

2. The high-voltage battery according to claim 1, wherein each battery module further comprises:
   two clamps which are guided along the stacking direction on opposite sides of the cell stack and which are mechanically connected to the end pressure plates for compressing the battery cells and are mechanically connected to the at least one intermediate pressure plate.

3. The high-voltage battery according to claim 2, wherein the at least one intermediate pressure plate is positively connected to the clamps.

4. The high-voltage battery according to claim 1, wherein each battery module further comprises:
   a cell-contacting system which is arranged on the top side of the cell stack and has at least one opening for the coolant connection, wherein
   the at least one coolant line, which is fluidically couplable to the coolant connection, is arranged on a top side of the cell-contacting system.

5. The high-voltage battery according to claim 1, wherein the coolant connection has two stubs in the form of an inlet stub and an outlet stub, and
the at least one intermediate pressure plate has a first passage opening for the inlet stub and a second passage opening for the outlet stub.

6. The high-voltage battery according to claim 5, wherein the two stubs are arranged next to one another in a width direction, which is oriented perpendicularly to the vertical direction and to the stacking direction, on the top side of the cooling plate.

7. The high-voltage battery according to claim 6, wherein the two stubs extend at least over an entire length of the passage openings in the at least one intermediate pressure plate in the vertical direction.

8. The high-voltage battery according to claim 5, wherein each battery module further comprises:
a monolithic connecting piece for connecting the two stubs on the top side of the cell stack to two coolant lines which are guided along the top side of the cell stack.

9. The high-voltage battery according to claim 8, wherein the connecting piece has two T-piece-shaped elements, wherein a first T-piece-shaped element is connected to the inlet stub and is connectable to a first coolant line, and a second T-piece-shaped element is connected to the outlet stub and is connectable to a second coolant line.

10. The high-voltage battery according to claim 9, wherein
the respective sections of the T-piece-shaped elements, which sections are connectable to the coolant lines, are oriented parallel to the top side of the cell stack along a width direction which is oriented perpendicularly to the vertical direction and to the stacking direction.

11. The high-voltage battery according to claim 10, wherein
the respective sections of the T-piece-shaped elements, which sections are connectable to the coolant lines, are arranged one behind the other in the stacking direction, and
further respective sections of the T-piece-shaped elements, which sections are connected to the stubs, are arranged next to one another in the width direction.

12. The high-voltage battery according to claim 11, wherein
the at least two battery modules are arranged next to one another along a width direction which is oriented perpendicularly to the vertical direction and to the stacking direction, and
the at least one coolant line is guided along the top sides of the cell stacks in the width direction.

13. A motor vehicle comprising a high-voltage battery according to claim 1.

* * * * *